US011217232B2

(12) United States Patent
Haze et al.

(10) Patent No.: US 11,217,232 B2
(45) Date of Patent: Jan. 4, 2022

(54) RECOMMENDATIONS AND FRAUD DETECTION BASED ON DETERMINATION OF A USER'S NATIVE LANGUAGE

(71) Applicant: SAP Portals Israel Ltd., Ra'anana (IL)

(72) Inventors: Oren Haze, Kfar Saba (IL); Yihezkel Schoenbrun, Ra'anana (IL)

(73) Assignee: SAP Portals Israel Ltd., Ra'anana (IL)

( * ) Notice: Subject to any disclaimer, the term of this patent is extended or adjusted under 35 U.S.C. 154(b) by 214 days.

(21) Appl. No.: 16/126,146

(22) Filed: Sep. 10, 2018

(65) Prior Publication Data

US 2020/0082815 A1    Mar. 12, 2020

(51) Int. Cl.
| | | |
|---|---|---|
| *G10L 15/19* | (2013.01) | |
| *G10L 15/00* | (2013.01) | |
| *G10L 15/30* | (2013.01) | |
| *G06F 16/9535* | (2019.01) | |
| *G10L 15/22* | (2006.01) | |
| *G06N 20/00* | (2019.01) | |
| *G06F 16/2457* | (2019.01) | |

(52) U.S. Cl.
CPC ........ *G10L 15/19* (2013.01); *G06F 16/24575* (2019.01); *G06F 16/9535* (2019.01); *G06N 20/00* (2019.01); *G10L 15/005* (2013.01); *G10L 15/22* (2013.01); *G10L 15/30* (2013.01)

(58) Field of Classification Search
CPC ....... G10L 15/19; G10L 15/22; G10L 15/005; G10L 15/30; G10L 25/51; G06F 16/9535; G06F 16/24575; G06F 16/3344; G06N 20/00

USPC .............. 704/270, 9, 2; 706/47, 14; 707/722
See application file for complete search history.

(56) References Cited

U.S. PATENT DOCUMENTS

| | | | |
|---|---|---|---|
| 7,107,204 B1* | 9/2006 | Liu ....................... | G06F 40/232 704/2 |
| 9,132,349 B2 | 9/2015 | Haze et al. | |
| 9,418,060 B1* | 8/2016 | Winham ............ | G06Q 30/0282 |
| 9,607,620 B2* | 3/2017 | Jones ................ | H04M 3/42221 |
| 10,496,935 B2 | 12/2019 | Sachdev et al. | |
| 2003/0106058 A1* | 6/2003 | Zimmerman ...... | H04N 21/4532 725/46 |
| 2008/0139112 A1* | 6/2008 | Sampath ................. | H04L 67/26 455/3.04 |
| 2011/0209143 A1 | 8/2011 | Ierullo | |
| 2011/0264522 A1 | 10/2011 | Chan et al. | |
| 2011/0264650 A1 | 10/2011 | Tobin et al. | |

(Continued)

OTHER PUBLICATIONS

U.S. Appl. No. 16/113,770, filed Aug. 27, 2017, Ramon-Gonen et al.

(Continued)

*Primary Examiner* — Akwasi M Sarpong
(74) *Attorney, Agent, or Firm* — Fish & Richardson P.C.

(57) ABSTRACT

Input data is received, by a server, for a user from one or more data sources. A set of user language features associated with the input data are determined. The set of user language features is compared to multiple sets of known language features. Each set of known language features includes language features associated with the use of a non-native language by a speaker of a respective native language. A native language of the user is determined based on the comparing. A personalized recommendation is generated based on the determined native language of the user.

20 Claims, 3 Drawing Sheets

(56) References Cited

U.S. PATENT DOCUMENTS

| | | | |
|---|---|---|---|
| 2011/0282669 A1* | 11/2011 | Michaelis | G10L 25/90 704/270 |
| 2012/0110565 A1 | 5/2012 | O'Sullivan et al. | |
| 2012/0117015 A1* | 5/2012 | Sathish | G06N 5/025 706/47 |
| 2012/0173729 A1 | 7/2012 | Lee et al. | |
| 2012/0303561 A1* | 11/2012 | Sathish | G06N 20/00 706/14 |
| 2013/0262641 A1 | 10/2013 | Zur et al. | |
| 2014/0012924 A1 | 1/2014 | Jagemauth | |
| 2014/0195297 A1 | 7/2014 | Abuelsaad et al. | |
| 2014/0244617 A1* | 8/2014 | Rose | G06F 16/58 707/722 |
| 2015/0347912 A1 | 12/2015 | Rodzevski et al. | |
| 2015/0351655 A1 | 12/2015 | Coleman | |
| 2016/0188671 A1 | 6/2016 | Gupta et al. | |
| 2017/0186338 A1* | 6/2017 | Treves | G09B 7/02 |
| 2017/0270432 A1 | 9/2017 | Sachdev et al. | |
| 2017/0353603 A1 | 12/2017 | Grunewald et al. | |
| 2018/0061417 A1* | 3/2018 | Radadia | G10L 15/26 |
| 2018/0075513 A1 | 3/2018 | Bastide et al. | |
| 2018/0145998 A1* | 5/2018 | Shaikh | H04L 63/1425 |
| 2018/0260914 A1 | 9/2018 | Kemp et al. | |
| 2019/0073996 A1* | 3/2019 | Millen | G06N 3/08 |
| 2019/0179633 A1 | 6/2019 | Agarwal et al. | |
| 2020/0082021 A1 | 3/2020 | Haze et al. | |
| 2020/0082307 A1 | 3/2020 | Haze | |

OTHER PUBLICATIONS

Non-Final Office Action issued in U.S. Appl. No. 16/126,118 dated May 22, 2020, 21 pages.

Final Office Action issued in U.S. Appl. No. 16/126,118 dated Sep. 21, 2020, 34 pages.

Non-Final Office Action issued in U.S. Appl. No. 16/126,144 dated Jul. 13, 2020, 33 pages.

Bachwani et al., "Mojave: A recommendation system for software upgrades." Oct. 2012, 8 pages.

Non-Final Office Action issued in U.S. Appl. No. 16/126,144 dated May 11, 2021, 29 pages.

* cited by examiner

RECOMMENDATIONS AND FRAUD DETECTION BASED ON DETERMINATION OF A USER'S NATIVE LANGUAGE

CROSS-REFERENCE TO RELATED APPLICATIONS

This application is an application of, and filed in conjunction with, U.S. patent application Ser. No. 16/126,118, filed on Sep. 10, 2018, entitled "REAL-TIME MATCHING OF USERS AND APPLICATIONS", and U.S. patent application Ser. No. 16/126,144, filed on Sep. 10, 2018, entitled "REAL-TIME MATCHING OF USERS TO ENTERPRISE INTERFACES AND ARTIFACTS", the entire contents of each which are incorporated herein by reference.

BACKGROUND

Different characteristics can be used to define and distinguish human languages. For example, each human language can have a unique grammar and sentence structure as well as a unique lexicon or vocabulary. As another example, a given language can have unique idioms that do not have the same meaning in other languages. For instance, a phrase such as "the cat's meow" may mean "something outstanding" to an English speaker but may have a more literal meaning to non-English speakers.

SUMMARY

The present disclosure describes recommendation generation and fraud detection based on determination of a user's native language.

In an implementation, input data is received, by a server, for a user from one or more data sources. A set of user language features associated with the input data are determined. The set of user language features is compared to multiple sets of known language features. Each set of known language features includes language features associated with the use of a non-native language by a speaker of a respective native language. A native language of the user is determined based on the comparing. A personalized recommendation is generated based on the determined native language of the user.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, a product can be customized for a user based on an automatic detection of a native language of the user. Second, sales can be improved by improving prediction of products-of-interest based on automatic determination of a user's native language, and can provide insights regarding the user's "origin", culture, or preferences. Third, system fraud can be detected based on determining that language features associated with recent use by a user do not match language features previously associated with the user. Fourth, fraud detection can be improved by detecting one or more discrepancies between a user's stated native country and language features determined to be associated with the user.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
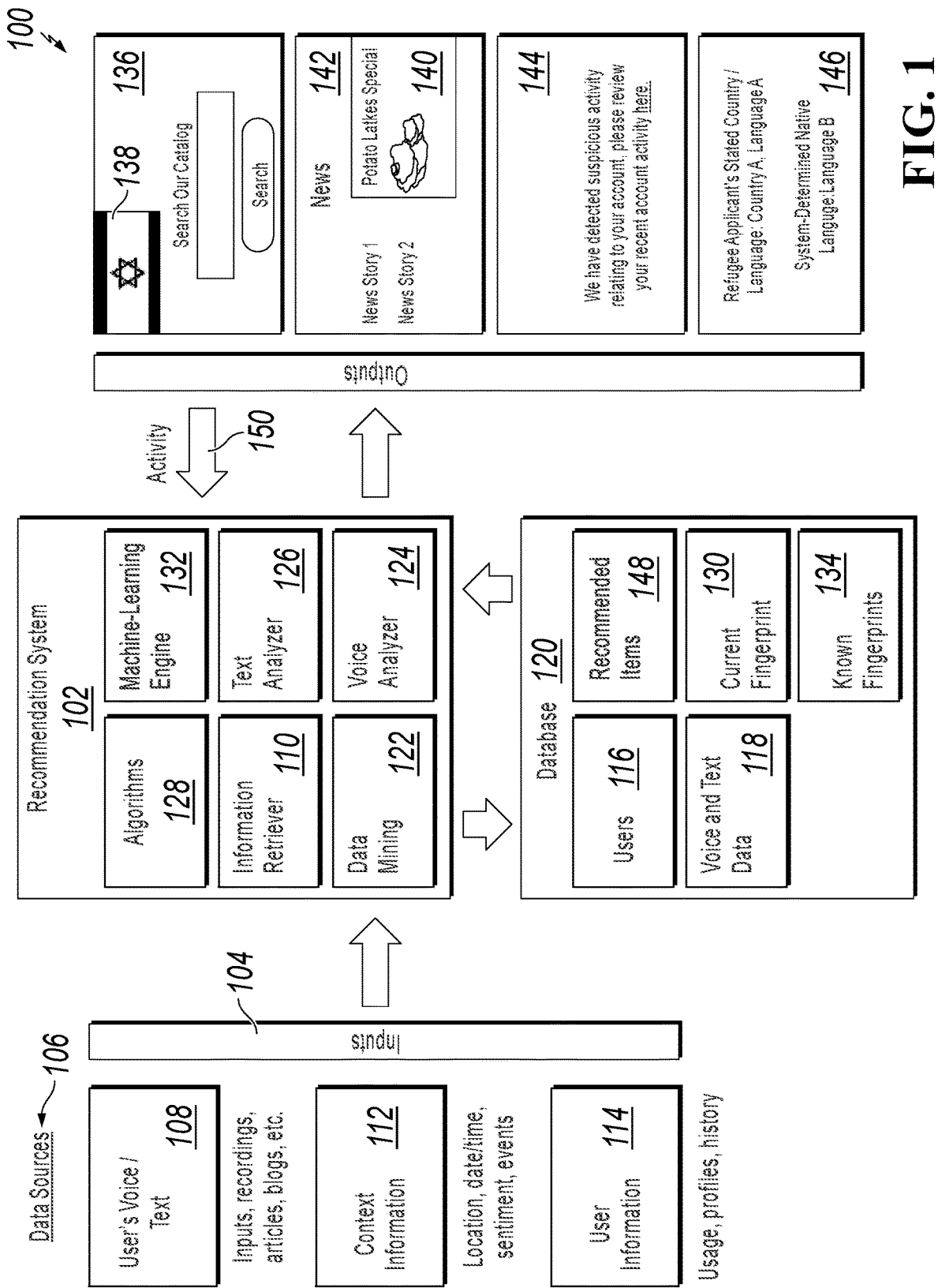
FIG. 1 is a block diagram illustrating an example of a system for recommendation generation and fraud detection based on determination of a user's native language, according to an implementation of the present disclosure.

The following detailed description describes recommendation generation and fraud detection based on determination of a user's native language, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

When people who natively speak a given language (referred within as a "mother tongue") speak in another non-native language, they tend to make grammatical mistakes in a similar and consistent manner as other speakers of the mother tongue. For example, grammar and sentence structure used when speaking the other language may resemble that of their mother tongue in cases when the grammars of the two languages diverge. Additionally, literal translations of native phrases can lead to idiomatic mistakes in the non-native language.

Grammar of the mother tongue can become "fossilized" for a speaker when that speaker speaks the non-native language. Even after learning a new language, most people retain much of the grammar of their mother tongue. A collection of grammatical and idiomatic mistakes that speakers of a given language often make when speaking a non-native language can create a grammatical "fingerprint" for the given language. A given speaker's mistakes may often be similar to the grammatical fingerprint—speakers generally do not easily lose their fingerprint, even when speaking a non-native language. Not all native speakers of a given language A will make the same mistakes when speaking a non-native language B, but over a body of speakers, certain mistakes may be common, and each mistake, when identified and recognized as being in the fingerprint, can be an indicator that a given speaker's mother tongue is actually language A.

When a non-native language is verbalized, other indicators can be present. For example, some speakers whose native language is not English may often pronounce "R's" differently than native English speakers. Accent can be a major marker, in general. For instance, speakers whose native languages lack a soft "g" or that have a preference for or against diphthongs may sound differently when speaking a non-native language than speakers whose mother tongue is that language.

Analyzing a speaker's grammatical and idiomatic mistakes, and other markers, whether written or verbal, can lead to an indication of which language is a mother tongue for a given speaker. Comparing mistakes and other markers to grammatical fingerprints of various languages can indicate which language is that person's native language. For example, a match score can be computed between a speaker's voice or text input and each of multiple language fingerprints. A language that has a fingerprint with a highest match score can be identified as a likely native language for the speaker.

Once a native language has been identified, outputs of a system can be tailored for the user, based on the identified language. System appearance and content can be altered to correlate with the identified native language, to create a deeper connection with users. As another example, identification of a likely native language can be used for fraud detection.

FIG. 1 is a block diagram illustrating an example of a system 100 for recommendation generation and fraud detection based on determination of a user's native language, according to an implementation of the present disclosure. A recommendation system 102 can receive a variety of inputs 104 from a variety of data sources 106. User voice or text data 108 can be obtained by an information retriever 110. In some cases, voice input can be audio recording(s) of a user's speech. Voice input can be obtained in real-time as a user is speaking or can be pre-recorded audio. In some implementations, audio recordings can be obtained from a user's use of IoT (Internet of Things) devices, electronic assistant devices, voice-input spoken into smart phones, or other recordings. Speech input is becoming a common form of device input, so other types of voice input, consistent with this disclosure, are anticipated. In some implementations, obtained audio recordings can be recordings for which a user has given use permission. In some cases, conversational voice input can be unfiltered and un-normalized and can represent a natural form of speaking for a user (as compared to written text which may be intentionally normalized or adjusted to match a particular style or language pattern). Voice input can be preferable, due to presence of additional markers, such as accent.

In some implementations, text input can be obtained in addition to or alternatively to voice input. Text input can be generated by various systems, including through participation in forums or social postings and interactions, including from any computing system that allows a user to participate in a free-form-type commentary discussion. In some implementations, computing systems can include a chat feature for conversing with support personnel. The recommendation system 102 can also be configured to identify articles or blogs a user may have authored. In some cases, an existing system which does not have user text input can be modified (for purposes of interfacing with the recommendation system 102) to include textual input, such as through addition of free-form questions a user would submit during an enrollment process.

Other types of inputs 104 include context information 112 and other user information 114. The information retriever 110 can obtain other information about a user other than the voice and text input 108. User information 114 can include user profile information, for example. User profile information can include user-provided information, such as a stated language or country, or preferences. In some implementations, user profile information can also include user activity information or derived preferences. For example, user information 114 can include various categories to which a user has been assigned, either by the user or by a system. User information 114 can also include social data. User information 114 received by the recommendation system 102 can be information for which the recommendation system 102 has been permitted to obtain, by a particular user or organization.

Context information 112 can include context related to the user (or user information 114) or context about the voice and text input 108. For example, context information 112 can include a user's current and recent locations, date and time information for a time of a current recommendation processing, or date, time, or location information associated with other information, such as the voice and text input 108. In another example, the context information 112 can be used to augment the user information 114 and can indicate that the user performs certain types of activities at certain times-of-day, days-of-week, or times-of-year.

Context information can include sentiment and event information. For example, event information can relate to a reminder or a due date by which a user recommendation should be made, due to upcoming expiration dates of offers related to particular languages. In some implementations, event information can include events related to particular languages, countries, or cultures (such as, holidays). In some cases, event information can include recent or historical events related to potential fraud (for a given user, the recommendation system, or other systems). Sentiment information can include a user's sentiment relating to past use of products and services.

The user information 114 and context information 112 can be metadata that is used for recommendation generation, as described in following paragraphs. The information retriever 110 can periodically (for example, every minute, hour, day) request voice and text input 108, context information 112, or user information 114 from a list of known data sources 106. As another example, the information retriever 110 can automatically receive voice and text input 108, context information 112, or user information 114 from the data sources 106. The data sources 106 can be configured to periodically provide voice and text input 108, context information 112, or user information 114, for example. As another example, the data sources 106 can be configured to provide voice and text input 108 or user information 114 when voice, text, or user information change in a data source 106, due to new, changed, or deleted information. In addition to obtaining external voice and text input 108, context information 112, or user information 114, the recommendation system 102 can obtain user information 116 or voice and text data 118 that is stored internally in a database 120 by the recommendation system 102 or by another system at a same organization as the recommendation system 102.

A data mining component 122 can determine a set of language features for the user based on the received inputs 104. In some implementations, the data mining component 122 can use a voice analyzer 124 and a text analyzer 126 to determine a dominant language used in the voice and text data 118. The dominant language can be an only language, or a language used more often than other languages, for the user in the voice and text data 118. The dominant language can be identified as an input language for further processing. The data mining component 122 can be used to determine frequency statistics for language features present in the voice and text data 118 for the user. For example, the voice analyzer 124 and the text analyzer 126 can determine frequency statistics for use of certain grammar patterns, sentence structure, idioms, lexicons, and spelling errors in voice and text data received for the user, respectively. The voice analyzer 124 can be used to determine whether received voice input was spoken with an accent or other variations not common to speakers of the input language.

In some implementations, the voice analyzer 124 or the text analyzer 126 can use algorithms from an algorithms library 128. The algorithms library 128 can include third-party audio processing routines, such as for speech recognition or accent recognition. The algorithms library 128 can also include routines for pattern recognition, which can be used to identify idioms, grammar patterns, or lexicons.

The data mining component 122 can build a language fingerprint 130 for the user, based on the determined language features. The language fingerprint 130 can include a collection of language features determined for the user. The collection of language features can include language features that have been determined to occur for the user at or above a pre-determined frequency for the feature. A predetermined frequency can be the same for all features or types of features or different for different features or types of features. For example, an idiom can be included in the collection of language features if the user uses a non-input-language idiom at least 50% of the time rather than an equivalent input-language phrase. A non-input language idiom can be an idiom common in a language other than the input language but not common in the input language. As another example, an idiom, grammar pattern, use of certain vocabulary, or spelling errors can be included in the collection of language features if they have occurred for the user (for example, at least N times for the user, with N being a positive integer).

In some implementations, language features included in the language fingerprint 130 can each be assigned a weight value, where the weight can indicate a frequency-of-use or a confidence that a certain language feature applies to the user. For example, the language fingerprint 130 can include a "German-accent" feature, with a 70% confidence or strength score which indicates how strongly the German accent applies to, or has been determined to apply to, the user.

In some implementations, a machine-learning engine 132 can compare the language fingerprint 130 to each of multiple of known fingerprints 134 to determine a level of match between the language fingerprint 130 and each of the known fingerprints 134. The machine-learning engine 132 can use a set of heuristics or rules, when comparing. In some cases, each known fingerprint can include a collection of language features that are common to speakers of a particular language. A known fingerprint can exist for multiple known human languages, such as English, German, or Hebrew. As another example, known fingerprints can exist for each pairing of known human languages. A known fingerprint for a language pair can include language features that a speaker having a certain native language uses when speaking a non-native language. For instance, a Hebrew-English known footprint can include language features that native Hebrew people often use when speaking English as a second language. A Hebrew-English known footprint can include a common phrase of "to come to me", for example, since Israeli people may often say "to come to me" in English instead of "come to me", due to fossilized grammar. As another example, the Hebrew-English known footprint can include an idiom of "words are too short", due to some Israeli people using that literal translation of a Hebrew phrase that means "words can't express".

In some implementations, an initial set of known footprints 134 can be included in the recommendation system 102 as training data for the machine-learning engine 132. Known footprints 134 can also be updated over time, by the machine-learning engine 132, as described in following paragraphs.

A level of match can indicate a strength of match between the fingerprint 130 and a respective known fingerprint, and can be based on how many language features are shared between the language fingerprint 130 and the known fingerprint. As an example, the machine-learning engine 132 can identify language features that are common between the language fingerprint and a known language fingerprint, determine a strength score for each language feature that indicates how strongly the user matches the language feature, and aggregate the strength scores for all common languages features to determine an overall level of match between the fingerprint 130 and the known fingerprint.

A highest matching known fingerprint can be determined based on the levels of match determined for each of the known fingerprints 134. The level of match for the highest matching known fingerprint can represent a likelihood that the user's native language is a language associated with the known fingerprint. The machine-learning engine 132 can adjust the determined likelihood based on other information, such as the received user information 114 and context information 112. For example, received user information 114 can indicate a potential native language of the user, due to preferences or profile information (which can include a user-stated language or country-of-origin, or a language- or country-of-origin previously derived by another system). Social data can indicate a native language or country-of-origin. For example, other users' conversations that are related to the user can indicate a country-of-origin or native language (such as by including country or language-specific references, or by a high-frequency of a user's acquaintances using language features associated with a particular country or language).

As another example, the machine-learning engine 132 can compare user information 114 for the user to user information 114 of other users for which processing has been performed. If the user information 114 for the user has a strong degree of match to user information stored for other users, and if the other users have, collectively, a most-often-assigned native language, then the strong degree of match can indicate that the user also has that same native language. As yet another example, the machine-learning engine 132 can compare the language footprint 130 to language footprints that have been determined for other users. If the language footprint for the user has a strong degree of match with language footprints determined for other users, and if the other users have, collectively, a most-often-assigned native language, then the strong degree of match can indicate that the user also has that same native language.

If information other than the match to a known fingerprint 132 indicates that a user's native language is the same language as that of a highest matching known fingerprint, the machine-learning engine 132 can increase the likelihood that the user's native language is the language associated with the known fingerprint. If other information indicates that a user's native language is a language other than the language associated with the highest-matching known fingerprint, the machine-learning engine 132 can decrease the likelihood that the user's native language is the language associated with the known fingerprint. The machine-learning engine 132 can determine to assign a determined native language to the user if the likelihood that the user's native language is the language associated with the highest matching known fingerprint is more than a predetermined threshold. For example, the machine-learning engine 132 can assign a native language of Hebrew to a user if the machine-learning engine 132 has calculated at least an 80% likelihood that the language fingerprint 130 matches a known Hebrew fingerprint.

The machine-learning engine 132 can, after assigning a determined native language to the user, store the determined native language, in association with the user, in user information 116. The machine-learning engine 132 can update a known fingerprint 134 associated with the determined native language, with information about the user or information in the language fingerprint 130 of the user. Given that the machine-learning engine 132 believes that the user has a particular native language, the machine-learning engine 132 can more likely assign that same native language, in the future, to other users who are similar to the user or have similar language footprints as the user.

Based on the user being assigned a particular native language, the recommendation system 102 can generate a personalized recommendation associated with the user. For instance, the recommendation system 102 can recommend or generate a change to a user experience for the user. For instance, a user interface 136 can be customized to include a logo 138 of an Israeli flag based on an assigning of a native language of Hebrew to a user. As another example, the recommendation system 102 can recommend a particular product based on an assigning of a particular native language to a user. For instance, a promotion 140 can be displayed on a user interface 142, for potato latkes, based on the assigning of a native language of Hebrew to a user. In general, the recommendation system 102 can create recommendations with a goal of creating nostalgia surrounding a user's country or origin or native language, which can enhance sales, customer loyalty, or marketing, due to providing an authentic experience for the user that matches their personal cultural background. Personalization can include changing a theme, selecting certain colors, or recommending products that are common to a culture of the user's country-of-origin.

The recommendation system 102 can determine, based on a native language determined for the user differing from a previous language associated with the user, which potentially fraudulent activity may be occurring (or may have occurred) with an account of the user. For example, a newly-determined language may differ from a language previously determined for the user by the machine-learning engine 132, which may indicate that a different user is now using a device or an account than a previous user (which can indicate a hacked account or a stolen device). The recommendation system 102 can create an alert, or a recommendation to investigate, which can be sent to a threat detection department, or to the user (such as, using a contact method which may be deemed to be safe/unrelated to current potential fraud). For instance, an alert 144 can be sent to a user indicating that recent activity (including voice/text input that doesn't match a previously-determined language) may have been fraudulent.

As another example, a user may have previously and explicitly declared a native language, and that language may have been retrieved by the information retriever 111 from a user profile, for example. If the machine-learning engine 132 determines a different native language for the user, with high confidence, the machine-learning engine 132 can determine that the user account has been possibly hacked, as described previously, or that the user possibly provided false information. The recommendation system 102 can generate an alert, to be provided to a threat detection system or to a computing system at which the user previously provided the potentially false information.

An indication of fraud determined based on a difference in a language previously associated with the user and a newly-determined language can be used as one signal for potential fraud detection, among other signals. If a difference involves certain languages that are associated with higher occurrences of fraud, a higher fraud indicator score can be generated for those differences as compared to differences involving languages that have less fraud occurrence. A fraud determination can be determined by the recommendation system 102 or fraud indicators can be provided to a threat detection system, for consideration by the threat detection system.

The recommendation system 102 can, for some systems or users, ask the user to confirm an automatically determined native language. As another example, for some systems or users, the recommendation system 102 (or another system) can explicitly ask a user for their native language, such as an input before automatic language determination takes place, to be used as a comparison against an automatically determined language. As a particular example, a refugee process can include asking a refugee for their country-of-origin, and if necessary for distinction, their native language. User language input for the refugee, such as answers to screening questions (which can be voice or text) can be provided to the recommendation system 102. The recommendation system 102 can automatically determine a native language for the refugee based on the user language input for the refugee, according to the previously described language determination process. The automatically-determined language can be compared (by the recommendation system 102, by a government official, or both) to the refugee-stated language. If a difference in languages is detected, refugee misrepresentation of their native language can be investigated. For example, the recommendation system 102 can generate an alert 146.

Generated recommendations (customizations, alerts) can be stored by the recommendation system 102 as stored recommended items 148. Activity information 150 relating to generated recommendations can be received by and stored by the recommendation system 102. Activity can include explicit feedback provided by a user for a customized user interface, performance information (impressions, selections, conversions) associated with customized product offerings, sales rates of recommended products, information on alerts being acted on, or user confirmation of a determined language. The received activity 150 can be used by the machine-learning engine 132 to tailor future recommendations. For example, if negative feedback is received for certain user interface customizations, such customizations can be halted, or modified, in the future. As another example, if a certain product recommendation results in conversions higher than a predetermined threshold conversion rate, that product can be recommended more often in the future, to other users who have a same determined native language.

Figure 2:
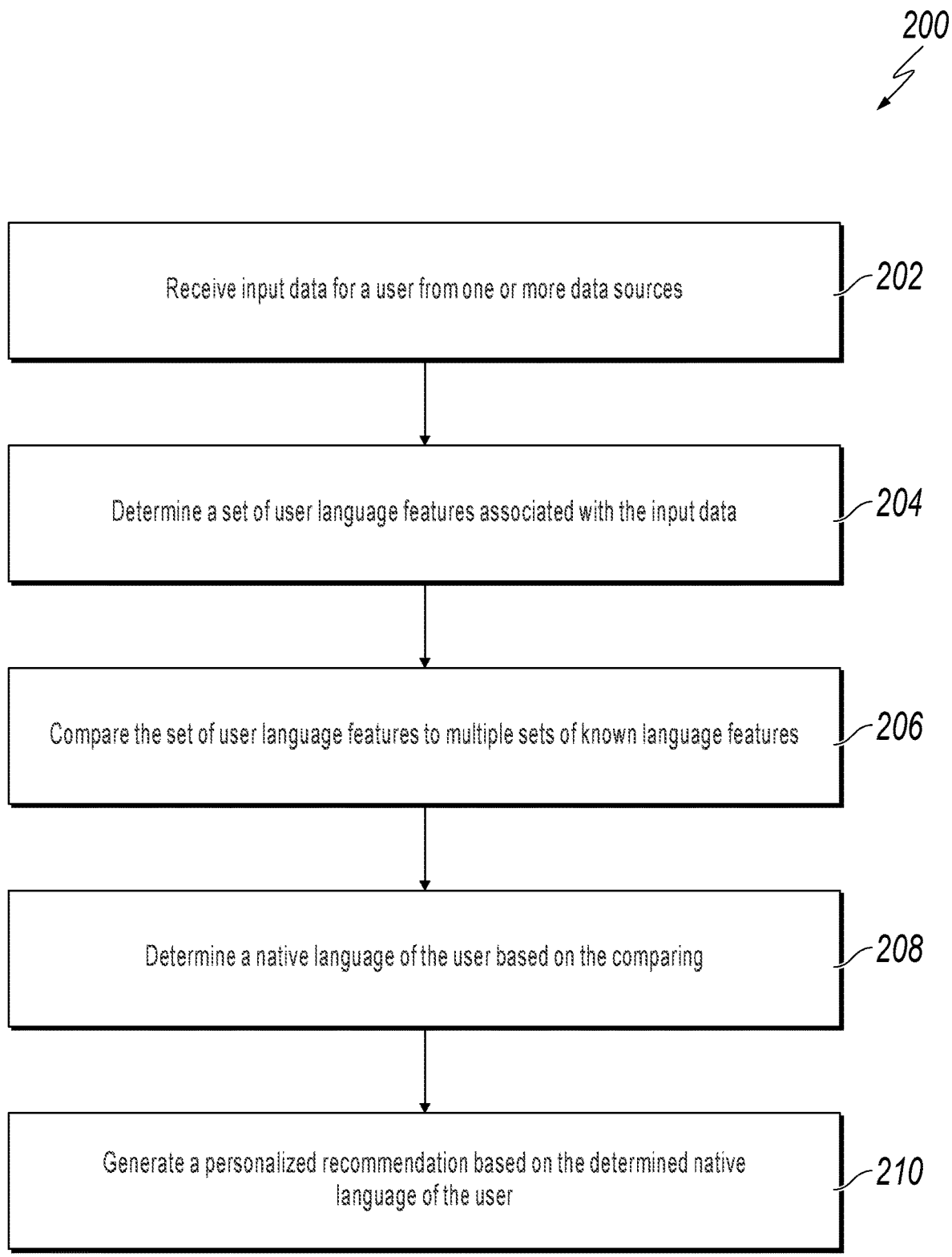
FIG. 2 is a flowchart illustrating an example of a computer-implemented method for recommendation generation and fraud detection based on determination of a user's native language, according to an implementation of the present disclosure.

FIG. 2 is a flowchart illustrating an example of a computer-implemented method 200 for recommendation generation and fraud detection based on determination of a user's native language, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, input data is received, by a server, for a user, from one or more data sources. The input data can be audio (voice) data or text data. From 202, method 200 proceeds to 204.

At 204, a set of user language features associated with the input data is determined. The user language features can include grammar, sentence structure, a used lexicon, use of idioms, and presence of an accent. From 204, method 200 proceeds to 206.

At 206, the set of user language features is compared to multiple sets of known language features. Each set of known language features can include language features associated with the use of a non-native language by a speaker of a respective native language. From 206, method 200 proceeds to 208.

At 208, a native language of the user based is determined based on the comparing. From 208, method 200 proceeds to 210.

At 210, a personalized recommendation is generated based on the determined native language of the user. The personalized recommendation can be a recommendation for one or more products associated with the determined native language, a customized user interface that has been customized based on the determined native language, or a recommendation to investigate potentially fraudulent activity based on determining a difference between the determined native language and a previously-determined native language of the user. After 220, method 200 stops.

Figure 3:
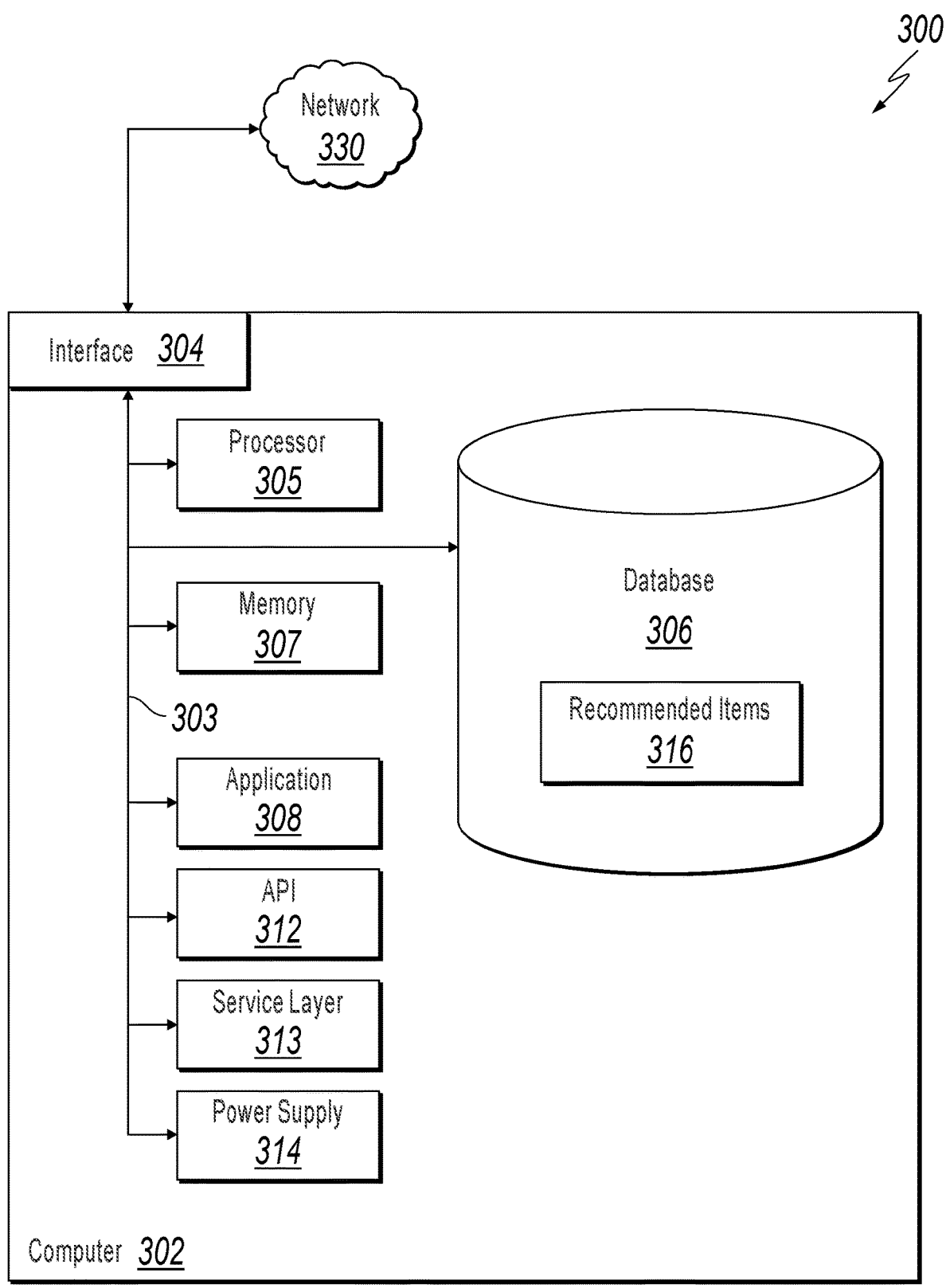
FIG. 3 is a block diagram illustrating an example of a computer-implemented system used to provide computational functionalities associated with described algorithms, methods, functions, processes, flows, and procedures, according to an implementation of the present disclosure.

FIG. 3 is a block diagram illustrating an example of a computer-implemented System 300 used to provide computational functionalities associated with described algorithms, methods, functions, processes, flows, and procedures, according to an implementation of the present disclosure. In the illustrated implementation, System 300 includes a Computer 302 and a Network 330.

The illustrated Computer 302 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 302 can include an input device, such as a keypad, keyboard, or touch screen, or a combination of input devices that can accept user information, and an output device that conveys information associated with the operation of the Computer 302, including digital data, visual, audio, another type of information, or a combination of types of information, on a graphical-type user interface (UI) (or GUI) or other UI.

The Computer 302 can serve in a role in a distributed computing system as, for example, a client, network component, a server, or a database or another persistency, or a combination of roles for performing the subject matter described in the present disclosure. The illustrated Computer 302 is communicably coupled with a Network 330. In some implementations, one or more components of the Computer 302 can be configured to operate within an environment, or a combination of environments, including cloud-computing, local, or global.

At a high level, the Computer 302 is an electronic computing device operable to receive, transmit, process, store, or manage data and information associated with the described subject matter. According to some implementations, the Computer 302 can also include or be communicably coupled with a server, such as an application server, e-mail server, web server, caching server, or streaming data server, or a combination of servers.

The Computer 302 can receive requests over Network 330 (for example, from a client software application executing on another Computer 302) and respond to the received requests by processing the received requests using a software application or a combination of software applications. In addition, requests can also be sent to the Computer 302 from internal users (for example, from a command console or by another internal access method), external or third-parties, or other entities, individuals, systems, or computers.

Each of the components of the Computer 302 can communicate using a System Bus 303. In some implementations, any or all of the components of the Computer 302, including hardware, software, or a combination of hardware and software, can interface over the System Bus 303 using an application programming interface (API) 312, a Service Layer 313, or a combination of the API 312 and Service Layer 313. The API 312 can include specifications for routines, data structures, and object classes. The API 312 can be either computer-language independent or dependent and refer to a complete interface, a single function, or even a set of APIs. The Service Layer 313 provides software services to the Computer 302 or other components (whether illustrated or not) that are communicably coupled to the Computer 302. The functionality of the Computer 302 can be accessible for all service consumers using the Service Layer 313. Software services, such as those provided by the Service Layer 313, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 302, alternative implementations can illustrate the API 312 or the Service Layer 313 as stand-alone components in relation to other components of the Computer 302 or other components (whether illustrated or not) that are communicably coupled to the Computer 302. Moreover, any or all parts of the API 312 or the Service Layer 313 can be implemented as a child or a sub-module of another software module, enterprise application, or hardware module without departing from the scope of the present disclosure.

The Computer 302 includes an Interface 304. Although illustrated as a single Interface 304, two or more Interfaces 304 can be used according to particular needs, desires, or particular implementations of the Computer 302. The Interface 304 is used by the Computer 302 for communicating with another computing system (whether illustrated or not) that is communicatively linked to the Network 330 in a distributed environment. Generally, the Interface 304 is operable to communicate with the Network 330 and includes logic encoded in software, hardware, or a combination of software and hardware. More specifically, the Interface 304 can include software supporting one or more communication protocols associated with communications such that the Network 330 or hardware of Interface 304 is operable to communicate physical signals within and outside of the illustrated Computer 302.

The Computer 302 includes a Processor 305. Although illustrated as a single Processor 305, two or more Processors 305 can be used according to particular needs, desires, or particular implementations of the Computer 302. Generally, the Processor 305 executes instructions and manipulates data to perform the operations of the Computer 302 and any algorithms, methods, functions, processes, flows, and procedures as described in the present disclosure.

The Computer 302 also includes a Database 306 that can hold data for the Computer 302, another component communicatively linked to the Network 330 (whether illustrated or not), or a combination of the Computer 302 and another component. For example, Database 306 can be an in-memory or conventional database storing data consistent with the present disclosure. In some implementations, Database 306 can be a combination of two or more different database types (for example, a hybrid in-memory and conventional database) according to particular needs, desires, or particular implementations of the Computer 302 and the described functionality. Although illustrated as a single Database 306, two or more databases of similar or differing types can be used according to particular needs, desires, or particular implementations of the Computer 302 and the described functionality. While Database 306 is illustrated as an integral component of the Computer 302, in alternative implementations, Database 306 can be external to the Computer 302. As illustrated, the Database 306 holds the previously described recommended items 316.

The Computer 302 also includes a Memory 307 that can hold data for the Computer 302, another component or components communicatively linked to the Network 330 (whether illustrated or not), or a combination of the Computer 302 and another component. Memory 307 can store any data consistent with the present disclosure. In some implementations, Memory 307 can be a combination of two or more different types of memory (for example, a combination of semiconductor and magnetic storage) according to particular needs, desires, or particular implementations of the Computer 302 and the described functionality. Although illustrated as a single Memory 307, two or more Memories 307 or similar or differing types can be used according to particular needs, desires, or particular implementations of the Computer 302 and the described functionality. While Memory 307 is illustrated as an integral component of the Computer 302, in alternative implementations, Memory 307 can be external to the Computer 302.

The Application 308 is an algorithmic software engine providing functionality according to particular needs, desires, or particular implementations of the Computer 302, particularly with respect to functionality described in the present disclosure. For example, Application 308 can serve as one or more components, modules, or applications. Further, although illustrated as a single Application 308, the Application 308 can be implemented as multiple Applications 308 on the Computer 302. In addition, although illustrated as integral to the Computer 302, in alternative implementations, the Application 308 can be external to the Computer 302.

The Computer 302 can also include a Power Supply 314. The Power Supply 314 can include a rechargeable or non-rechargeable battery that can be configured to be either user- or non-user-replaceable. In some implementations, the Power Supply 314 can include power-conversion or management circuits (including recharging, standby, or another power management functionality). In some implementations, the Power Supply 314 can include a power plug to allow the Computer 302 to be plugged into a wall socket or another power source to, for example, power the Computer 302 or recharge a rechargeable battery.

There can be any number of Computers 302 associated with, or external to, a computer system containing Computer 302, each Computer 302 communicating over Network 330. Further, the term "client," "user," or other appropriate terminology can be used interchangeably, as appropriate, without departing from the scope of the present disclosure. Moreover, the present disclosure contemplates that many users can use one Computer 302, or that one user can use multiple computers 302.

Described implementations of the subject matter can include one or more features, alone or in combination.

For example, in a first implementation, a computer-implemented method comprises: receiving, by a server, input data for a user from one or more data sources; determining a set of user language features associated with the input data; comparing the set of user language features to multiple sets of known language features, wherein each set of known language features comprises language features associated with the use of a non-native language by a speaker of a respective native language; determining a native language of the user based on the comparing; and generating a personalized recommendation based on the determined native language of the user.

The foregoing and other described implementations can each, optionally, include one or more of the following features:

A first feature, combinable with any of the following features, wherein the user language features comprise grammar, sentence structure, a used lexicon, and use of idioms.

A second feature, combinable with any of the previous or following features, wherein the input data comprises audio data and the user language features comprise presence of an accent.

A third feature, combinable with any of the previous or following features, wherein the personalized recommendation comprises a recommendation for one or more products associated with the determined native language.

A fourth feature, combinable with any of the previous or following features, wherein the personalized recommendation comprises a customized user interface that has been customized based on the determined native language.

A fifth feature, combinable with any of the previous or following features, further comprising comparing the determined native language to a previously-determined native language of the user.

A sixth feature, combinable with any of the previous or following features, further comprising determining a difference between the determined native language and the previously-determined native language, wherein generating a personalized recommendation comprises recommending investigation of fraudulent activity associated with an account of the user.

A seventh feature, combinable with any of the previous or following features, further comprising: receiving activity information for the personalized recommendation; configuring a machine learning engine using the activity information; and using the machine learning engine to tailor subsequent personalized recommendations for the user based on the received activity information.

In a second implementation, a non-transitory, computer-readable medium stores one or more instructions executable by a computer system to perform operations comprising: receiving, by a server, input data for a user from one or more data sources; determining a set of user language features associated with the input data; comparing the set of user language features to multiple sets of known language features, wherein each set of known language features comprises language features associated with the use of a non-native language by a speaker of a respective native language; determining a native language of the user based on the comparing; and generating a personalized recommendation based on the determined native language of the user.

The foregoing and other described implementations can each, optionally, include one or more of the following features:

A first feature, combinable with any of the following features, wherein the user language features comprise grammar, sentence structure, a used lexicon, and use of idioms.

A second feature, combinable with any of the previous or following features, wherein the input data comprises audio data and the user language features comprise presence of an accent.

A third feature, combinable with any of the previous or following features, wherein the personalized recommendation comprises a recommendation for one or more products associated with the determined native language.

A fourth feature, combinable with any of the previous or following features, wherein the personalized recommendation comprises a customized user interface that has been customized based on the determined native language.

A fifth feature, combinable with any of the previous or following features, further comprising comparing the determined native language to a previously-determined native language of the user.

A sixth feature, combinable with any of the previous or following features, further comprising determining a difference between the determined native language and the previously-determined native language, wherein generating a personalized recommendation comprises recommending investigation of fraudulent activity associated with an account of the user.

In a third implementation, a computer-implemented system includes one or more computers and one or more computer memory devices interoperably coupled with the one or more computers and having tangible, non-transitory, machine-readable media storing one or more instructions that, when executed by the one or more computers, perform one or more operations comprising: receiving, by a server, input data for a user from one or more data sources; determining a set of user language features associated with the input data; comparing the set of user language features to multiple sets of known language features, wherein each set of known language features comprises language features associated with the use of a non-native language by a speaker of a respective native language; determining a native language of the user based on the comparing; and generating a personalized recommendation based on the determined native language of the user.

The foregoing and other described implementations can each, optionally, include one or more of the following features:

A first feature, combinable with any of the following features, wherein the user language features comprise grammar, sentence structure, a used lexicon, and use of idioms.

A second feature, combinable with any of the previous or following features, wherein the input data comprises audio data and the user language features comprise presence of an accent.

A third feature, combinable with any of the previous or following features, wherein the personalized recommendation comprises a recommendation for one or more products associated with the determined native language.

A fourth feature, combinable with any of the previous or following features, wherein the personalized recommendation comprises a customized user interface that has been customized based on the determined native language.

A fifth feature, combinable with any of the previous or following features, further comprising comparing the determined native language to a previously-determined native language of the user.

A sixth feature, combinable with any of the previous or following features, further comprising determining a difference between the determined native language and the previously-determined native language, wherein generating a personalized recommendation comprises recommending investigation of fraudulent activity associated with an account of the user.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, by a server, input data for a user from one or more data sources;
   determining a set of user language features of the user based on the input data, wherein determining the set of language features of the user includes:
   identifying language features used by the user;
   for each language feature used by the user:
      determining a use frequency of the language feature that indicates a frequency of use by the user of the language feature;
      determining whether the use frequency of the language feature is at least a predetermined frequency for the language feature; and
      including the language feature in the set of user language features of the user in response to determining that the use frequency of the language feature is at least the predetermined frequency for the language feature;
   comparing the set of user language features of the user to multiple sets of known language features to determine a match score for each respective set of known language features that indicates a strength of match between the set of user language features of the user and the set of known language features, wherein each set of known language features that are compared to the set of user language features of the user comprises language features associated with the use of a non-native language by a speaker of a respective native language;

automatically determining a native language of the user based on determining that a match score of a highest matching set of known language features is more than a predetermined threshold; and generating a personalized recommendation based on the automatically determined native language of the user.

2. The computer-implemented method of claim 1, wherein the user language features comprise grammar, sentence structure, a used lexicon, and use of idioms.

3. The computer-implemented method of claim 1, wherein the input data comprises audio data and the user language features comprise presence of an accent.

4. The computer-implemented method of claim 1, wherein the personalized recommendation comprises a recommendation for one or more products associated with the determined native language.

5. The computer-implemented method of claim 1, wherein the personalized recommendation comprises a customized user interface that has been customized based on the determined native language.

6. The computer-implemented method of claim 1, further comprising comparing the determined native language to a previously-determined native language of the user.

7. The computer-implemented method of claim 1, further comprising determining a difference between the determined native language and the previously-determined native language, wherein generating a personalized recommendation comprises recommending investigation of fraudulent activity associated with an account of the user.

8. The computer-implemented method of claim 1, further comprising:
    receiving activity information for the personalized recommendation;
    configuring a machine learning engine using the activity information; and
    using the machine learning engine to tailor subsequent personalized recommendations for the user based on the received activity information.

9. A non-transitory, computer-readable medium storing one or more instructions executable by a computer system to perform operations comprising:
    receiving, by a server, input data for a user from one or more data sources;
    determining a set of user language features of the user based on the input data, wherein determining the set of language features of the user includes:
        identifying language features used by the user;
        for each language feature used by the user:
            determining a use frequency of the language feature that indicates a frequency of use by the user of the language feature;
            determining whether the use frequency of the language feature is at least a predetermined frequency for the language feature; and
            including the language feature in the set of user language features of the user in response to determining that the use frequency of the language feature is at least the predetermined frequency for the language feature;
    comparing the set of user language features of the user to multiple sets of known language features to determine a match score for each respective set of known language features that indicates a strength of match between the set of user language features of the user and the set of known language features, wherein each set of known language features that are compared to the set of user language features of the user comprises language features associated with the use of a non-native language by a speaker of a respective native language;
    automatically determining a native language of the user based on determining that a match score of a highest matching set of known language features is more than a predetermined threshold; and
    generating a personalized recommendation based on the automatically determined native language of the user.

10. The non-transitory, computer-readable medium of claim 9, wherein the user language features comprise grammar, sentence structure, a used lexicon, and use of idioms.

11. The non-transitory, computer-readable medium of claim 9, wherein the input data comprises audio data and the user language features comprise presence of an accent.

12. The non-transitory, computer-readable medium of claim 9, wherein the personalized recommendation comprises a recommendation for one or more products associated with the determined native language.

13. The non-transitory, computer-readable medium of claim 9, wherein the personalized recommendation comprises a customized user interface that has been customized based on the determined native language.

14. The non-transitory, computer-readable medium of claim 9, further comprising comparing the determined native language to a previously-determined native language of the user.

15. The non-transitory, computer-readable medium of claim 9, further comprising determining a difference between the determined native language and the previously-determined native language, wherein generating a personalized recommendation comprises recommending investigation of fraudulent activity associated with an account of the user.

16. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
        receiving, by a server, input data for a user from one or more data sources;
        determining a set of user language features of the user based on the input data, wherein determining the set of language features of the user includes:
            identifying language features used by the user;
            for each language feature used by the user:
                determining a use frequency of the language feature that indicates a frequency of use by the user of the language feature;
                determining whether the use frequency of the language feature is at least a predetermined frequency for the language feature; and
                including the language feature in the set of user language features of the user in response to determining that the use frequency of the language feature is at least the predetermined frequency for the language feature;
        comparing the set of user language features of the user to multiple sets of known language features to determine a match score for each respective set of known language features that indicates a strength of match between the set of user language features of the user and the set of known language features, wherein each set of known language features that are compared to the set of user language features of the user comprises language features associated with the use of a non-native language by a speaker of a respective native language;

automatically determining a native language of the user based on determining that a match score of a highest matching set of known language features is more than a predetermined threshold; and generating a personalized recommendation based on the automatically determined native language of the user.

17. The computer-implemented system of claim 16, wherein the user language features comprise grammar, sentence structure, a used lexicon, and use of idioms.

18. The computer-implemented system of claim 16, wherein the input data comprises audio data and the user language features comprise presence of an accent.

19. The computer-implemented system of claim 16, wherein the personalized recommendation comprises a recommendation for one or more products associated with the determined native language.

20. The computer-implemented system of claim 16, wherein the personalized recommendation comprises a customized user interface that has been customized based on the determined native language.

* * * * *